United States Patent
Gabbey et al.

(10) Patent No.: US 12,119,664 B2
(45) Date of Patent: Oct. 15, 2024

(54) SYSTEMS, TOOL STORAGE UNITS, AND METHODS FOR PROVIDING ELECTRICAL POWER

(71) Applicant: Snap-on Incorporated, Kenosha, WI (US)

(72) Inventors: Nicholas A. Gabbey, Mount Pleasant, WI (US); Ottoleo Kuter-Arnebeck, Kenosha, WI (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 17/750,285

(22) Filed: May 20, 2022

(65) Prior Publication Data
US 2023/0378809 A1 Nov. 23, 2023

(51) Int. Cl.
| | |
|---|---|
| *H02J 50/10* | (2016.01) |
| *A47B 88/919* | (2017.01) |
| *F21V 33/00* | (2006.01) |
| *H02J 50/20* | (2016.01) |
| *H02J 50/40* | (2016.01) |

(52) U.S. Cl.
CPC ............ *H02J 50/10* (2016.02); *A47B 88/919* (2017.01); *F21V 33/0084* (2013.01); *H02J 50/20* (2016.02); *H02J 50/40* (2016.02)

(58) Field of Classification Search
CPC ....... A47B 81/00; A47B 88/919; A47B 96/00; A47B 96/02; B25H 3/028; F21V 33/0084; H02J 50/10; H02J 50/12; H02J 50/20; H02J 50/40; H02J 50/90
See application file for complete search history.

(56) References Cited

U.S. PATENT DOCUMENTS

| | | |
|---|---|---|
| 8,317,350 B2 | 3/2012 | Nakamura |
| 8,228,026 B2 | 7/2012 | Johnson et al. |
| 8,328,381 B2 | 12/2012 | Dixon et al. |
| 8,421,407 B2 | 4/2013 | Johnson |
| 8,487,478 B2 | 7/2013 | Grob et al. |
| 8,506,108 B2 | 8/2013 | Friedman et al. |

(Continued)

FOREIGN PATENT DOCUMENTS

| | | |
|---|---|---|
| AU | 2015218412 A1 | 9/2015 |
| CN | 206140447 U | 5/2017 |

(Continued)

OTHER PUBLICATIONS

Shahmohammadi et al, "Circuit Model for Resonant Cavity Mode Enabled Wireless Power Transfer", https://ieeexplore.ieee.org/abstract/document/7824451, (2017).

(Continued)

*Primary Examiner* — Levi Gannon
(74) *Attorney, Agent, or Firm* — McDonnell Boehnen Hulbert & Berghoff LLP (57) ABSTRACT

A system for providing electrical power to an element coupled to a tool storage unit, the system comprising a transmitting unit coupled to the tool storage unit and a receiving unit coupled to the tool storage unit. The transmitting unit including a data processing and communication module and a transmitting antenna configured to be coupled to an electrical power supply and transmit energy. The receiving unit including a receiving antenna, and the element.

20 Claims, 5 Drawing Sheets

(56) References Cited

U.S. PATENT DOCUMENTS

| | | |
|---|---|---|
| 8,567,796 B2 | 10/2013 | Bar-Erez et al. |
| 8,611,815 B2 | 12/2013 | Mohammadian et al. |
| 8,629,650 B2 | 1/2014 | Mohammadian et al. |
| 8,720,239 B2 | 5/2014 | Crass et al. |
| 8,820,955 B2 | 9/2014 | Dixon et al. |
| 8,827,483 B2 | 9/2014 | Dixon et al. |
| 8,854,224 B2 | 10/2014 | Kirby et al. |
| 8,878,393 B2 | 11/2014 | Kirby et al. |
| 8,892,035 B2 | 11/2014 | Mohammadian et al. |
| 8,907,623 B2 | 12/2014 | Saur |
| 8,936,258 B2 | 1/2015 | Bar-Erez et al. |
| 8,965,461 B2 | 2/2015 | Toncich et al. |
| 9,028,088 B2 | 5/2015 | Vanko et al. |
| 9,106,083 B2 | 8/2015 | Partovi |
| 9,112,362 B2 | 8/2015 | Partovi |
| 9,112,363 B2 | 8/2015 | Partovi |
| 9,112,364 B2 | 8/2015 | Partovi |
| 9,130,407 B2 | 9/2015 | Toncich et al. |
| 9,132,543 B2 | 9/2015 | Bar-Erez et al. |
| 9,136,729 B2 | 9/2015 | Ashinghurst et al. |
| 9,166,440 B2 | 10/2015 | Ben-Shalom et al. |
| 9,178,369 B2 | 11/2015 | Partovi |
| 9,178,387 B2 | 11/2015 | Mohammadian et al. |
| 9,184,632 B2 | 11/2015 | Kirby et al. |
| 9,190,875 B2 | 11/2015 | Mohammadian et al. |
| 9,221,169 B2 | 12/2015 | Seidel |
| 9,236,771 B2 | 1/2016 | Toncich et al. |
| 9,312,924 B2 | 4/2016 | Ozaki et al. |
| 9,328,915 B2 | 5/2016 | Vanko et al. |
| 9,352,458 B2 | 5/2016 | Friedman et al. |
| 9,356,659 B2 | 5/2016 | Partovi |
| 9,478,991 B2 | 10/2016 | Weissentern et al. |
| 9,496,732 B2 | 11/2016 | Partovi |
| 9,553,471 B2 | 1/2017 | Chinnadurai et al. |
| 9,566,990 B2 | 2/2017 | Bar-Erez et al. |
| 9,583,953 B2 | 2/2017 | Kirby et al. |
| 9,643,629 B2 | 5/2017 | Bar-Erez et al. |
| 9,644,837 B2 | 5/2017 | Vanko et al. |
| 9,748,780 B2 | 8/2017 | Hitoshi et al. |
| 9,837,862 B2 | 12/2017 | Sherman et al. |
| 9,887,576 B2 | 2/2018 | Zhang et al. |
| 9,893,555 B1 | 2/2018 | Leabman et al. |
| 9,948,128 B2 | 4/2018 | Ashinghurst et al. |
| 9,954,399 B2 | 4/2018 | Toncich et al. |
| 9,991,747 B2 | 6/2018 | Toncich et al. |
| 10,063,096 B2 | 8/2018 | Rejman et al. |
| 10,106,180 B2 | 10/2018 | Bar-Erez et al. |
| 10,115,520 B2 | 10/2018 | Partovi |
| 10,126,368 B2 | 11/2018 | Rejman et al. |
| 10,141,770 B2 | 11/2018 | Partovi |
| 10,199,856 B2 | 2/2019 | Ashinghurst et al. |
| 10,293,476 B2 | 5/2019 | Fleischmann |
| 10,379,167 B2 | 8/2019 | Newport et al. |
| 10,411,510 B2 | 9/2019 | Sherman et al. |
| 10,418,828 B2 | 9/2019 | Schadow et al. |
| 10,543,588 B2 | 1/2020 | Vanko et al. |
| 10,575,417 B2 | 2/2020 | Sabbag et al. |
| 10,787,186 B2 | 9/2020 | Bar-Erez et al. |
| 10,976,047 B2* | 4/2021 | Weir ............... F21V 23/0471 |
| 10,992,185 B2 | 4/2021 | Leabman |
| 11,005,285 B2 | 5/2021 | Partovi |
| 11,063,473 B2 | 7/2021 | Dietzel et al. |
| 11,090,786 B2 | 8/2021 | Puzio |
| 2007/0290654 A1 | 12/2007 | Govari |
| 2009/0206674 A1* | 8/2009 | Noguchi ............... A61L 2/24 |
| | | 307/104 |
| 2009/0212638 A1* | 8/2009 | Johnson ............ H02J 7/0044 |
| | | 307/104 |
| 2009/0212639 A1 | 8/2009 | Johnson |
| 2010/0181964 A1 | 7/2010 | Huggins et al. |
| 2010/0201201 A1* | 8/2010 | Mobarhan ......... H02J 7/0044 |
| | | 320/108 |
| 2011/0140540 A1* | 6/2011 | Chu ..................... H02J 50/001 |
| | | 307/104 |
| 2012/0140963 A1* | 6/2012 | Larsen ................. H02J 50/40 |
| | | 381/315 |
| 2013/0234481 A1 | 9/2013 | Johnson |
| 2014/0036482 A1* | 2/2014 | Vanko ................... B25B 23/18 |
| | | 362/119 |
| 2014/0353191 A1 | 12/2014 | Decicco et al. |
| 2015/0022146 A1 | 1/2015 | Huber |
| 2015/0102769 A1 | 4/2015 | Leabman et al. |
| 2015/0227127 A1* | 8/2015 | Miller ................. G16H 20/13 |
| | | 700/244 |
| 2017/0211875 A1 | 7/2017 | Lee et al. |
| 2017/0244270 A1* | 8/2017 | Waters ................. H02J 50/10 |
| 2017/0310133 A1 | 10/2017 | Bickley |
| 2018/0241240 A1 | 8/2018 | Ashinghurst et al. |
| 2020/0063955 A1 | 2/2020 | Weir et al. |
| 2020/0114499 A1 | 4/2020 | Vanko et al. |
| 2021/0007189 A1 | 1/2021 | Monteiro |
| 2021/0104914 A1 | 4/2021 | Choist |
| 2021/0122027 A1 | 4/2021 | Amiaux |
| 2022/0009064 A1 | 1/2022 | Puzio |
| 2022/0102995 A1* | 3/2022 | Fieldbinder ............ H02J 50/80 |
| 2022/0167825 A1 | 6/2022 | Mersch |

FOREIGN PATENT DOCUMENTS

| | | |
|---|---|---|
| CN | 107671812 B | 9/2020 |
| CN | 211673199 U | 10/2020 |
| EP | 3402033 A1 | 11/2018 |
| WO | 2013042508 | 3/2013 |
| WO | 2019211148 | 11/2019 |
| WO | 2019216536 A1 | 11/2019 |

OTHER PUBLICATIONS

Search Report prepared by the United Kingdom Patent Office in application No. GB23071194 dated Nov. 8, 2023.

* cited by examiner

FIG. 5

SYSTEMS, TOOL STORAGE UNITS, AND METHODS FOR PROVIDING ELECTRICAL POWER

BACKGROUND

Typically, tool storage devices may include various drawers and enclosures to store equipment. For example, a tool storage device may have drawers at the top of the storage device that are designed to hold tools, and each drawer may be openable individually. Tool storage devices may also have wheels on the bottom so that the tool storage devices may be easily relocated from one location to another.

OVERVIEW

In an embodiment of a tool storage unit, a system for providing electrical power to an element coupled to a tool storage unit is provided. The system comprises a transmitting unit coupled to the tool storage unit. The transmitting unit includes a data processing and communication module and a transmitting antenna configured to be coupled to an electrical power supply and transmit energy. The system also includes a receiving unit coupled to the tool storage unit. The receiving unit includes a receiving antenna and the element.

In an embodiment of the tool storage unit, the element could be a light emitting diode (LED) light, an electric motor, or an actuator.

In an embodiment of the tool storage unit, the transmitting unit could be in the tool storage unit, and the receiving unit could be in in the tool storage unit.

In an embodiment of the tool storage unit, the transmitting antenna could include an induction coil or a radio frequency (RF) emitting antenna.

In an embodiment of the tool storage unit, the receiving antenna could include an induction coil or a RF emitting antenna.

In an embodiment of the tool storage unit, the transmitting unit could comprise at least one of an electrical power supply or first power electronics, and the receiving unit could further comprise second power electronics.

In an embodiment of the tool storage unit, the tool storage unit is provided. The tool storage unit includes a housing configured to store a tool, a transmitting unit mounted to the housing, a receiving unit mounted to the housing, and an electrically powered component mounted to the housing. The transmitting unit is configured to be electrically coupled to an electrical power supply and to transmit energy. The receiving unit includes a receiving antenna. The electrically powered component is electrically coupled to the receiving antenna. The transmitting antenna and the receiving antenna are positioned within a predetermined distance on the housing. The receiving antenna is configured to receive the energy transmitted by the transmitting antenna and to use the received energy to power the electrically powered component.

In an embodiment of the tool storage unit, the electrically powered component may be a LED light, an electric motor, an actuator, or a speaker.

In an embodiment of the tool storage unit, the transmitting antenna could include an induction coil or a RF emitting antenna.

In an embodiment of the tool storage unit, the receiving antenna could include an induction coil or a RF emitting antenna.

In an embodiment of the tool storage unit, the housing could include a first portion and a second portion. The transmitting unit could be mounted on the first portion. The receiving unit could be mounted on the second portion. The second portion could be configured to move with respect to the first portion such that the transmitting antenna and the receiving antenna are positioned within the predetermined distance.

In an embodiment of the tool storage unit, the electrically powered component could be fixedly mounted to the housing.

In an embodiment of the tool storage unit, the electrically powered component could be detachably mounted to the housing.

In an embodiment of the tool storage unit, the receiving antenna could be configured to receive energy transmitted by the transmitting antenna at least when the receiving antenna is parallel to the transmitting antenna.

In an embodiment of the tool storage unit, the receiving unit could include a plurality of receiving antennas. Each receiving antenna of the plurality of receiving antennas could be configured to receive energy from a common transmitting antenna.

In an embodiment of the tool storage unit, the receiving unit could further include an electric motor, and wherein the receiving antenna is an induction coil.

In an embodiment of the tool storage unit, the transmitting unit could be configured to induce a current in the receiving unit.

In an embodiment of the tool storage unit, the receiving antenna could be configured to receive energy in a radio frequency spectrum or a microwave frequency spectrum.

In an embodiment of the tool storage unit, the receiving unit could further comprise an energy storage element. The receiving unit could be configured to charge the energy storage element and the electrically powered component.

In an embodiment, a method for providing electrical power to an electrically powered component coupled to a tool storage unit is provided. The tool storage unit includes a housing configured to store a tool, a transmitting unit mounted to the housing, the transmitting unit electrically coupled to an electrical power supply, and a receiving unit mounted to the housing, where the electrically powered component is mounted to the housing and is electrically coupled to the receiving antenna. The method includes positioning a transmitting antenna of the transmitting unit within a predetermined distance of a receiving antenna of the receiving unit. The method includes receiving, via the electrical power supply, electrical power at the transmitting antenna. The method includes transmitting energy, via the transmitting antenna, to the receiving antenna. And the method includes powering the electrically powered component using energy received by the receiving antenna.

In another embodiment, a non-transitory computer-readable medium having stored thereon program instructions that upon execution of a processor, cause performance of operations, is provided. The operations include powering a transmitting antenna of a transmitting unit, wherein powering the transmitting antenna causes a receiving unit of a tool storage unit to receive energy. The tool storage unit includes a housing configured to store a tool, the transmitting unit mounted to the housing, the receiving unit mounted to the housing, and an electrically powered component mounted to the housing. The transmitting antenna is configured to be electrically coupled to an electrical power supply and to transmit energy. The electrically powered component is coupled to the receiving antenna. The transmitting antenna and the receiving antenna are positioned within a predetermined distance on the housing. The receiving antenna is configured to receive the energy transmitted by the transmitting antenna and to use the received energy to power the electrically powered component.

Other embodiments will become apparent to those of ordinary skill in the art by reading the following detailed description, with reference where appropriate to the accompanying drawings.

BRIEF DESCRIPTION OF THE DRAWINGS

Example embodiments are described herein with reference to the drawings.

The drawings are schematic and not necessarily to scale. In the drawings, similar symbols typically identify similar components, unless context dictates otherwise.

DETAILED DESCRIPTION

I. Introduction

Tool storage units may have electrically powered components to which battery packs and/or other external power sources may supply power. The electrically powered components may be connected to these power sources through wired connections. For example, a light source of a tool storage unit may be connected using a wire to a battery pack of the storage unit. Additionally or alternatively, the light source of the tool storage unit might be connected to a computing device that may supply power and may provide instructions on whether to turn on or off.

Further, the electrically powered component might be mounted to a movable element of the tool storage unit, and the power source might be mounted to a non-movable component of the tool storage unit. For example, a light source of the storage unit may be connected to a drawer of the tool storage unit to facilitate continuous illumination of the drawer regardless of the position of the drawer. The power source may be connected to the main power source and/or computing device, which may be mounted on the storage unit. However, as the drawer is pulled in and out of the tool storage unit over time, the wires connecting the drawer and the power source may start to wear down and/or break. Further, the wires may become caught between the drawer and the storage unit during the process of opening and/or closing the storage unit.

As another example, the light source may be attached to a housing door of the storage unit and/or connected to a power source of the storage unit. When a user opens and/or closes the housing, the wires connecting the light source and the power supply may become caught between the housing door and the rest of the tool storage unit.

The present tool storage unit provides a technical advance that may help to address one or more of these problems. In accordance with the present disclosure, the electrically powered component may be connected through a wired connection to a receiving unit, which may wirelessly receive energy transmitted by a nearby transmitting unit. The electrically powered component may be physically connected to the receiving unit and mounted on a movable component of the tool storage unit (e.g., a drawer, a door, etc.). When a user moves the electrically powered component and the receiving unit of the storage device to be proximate to the transmitting unit, the receiving unit may receive the energy transmitted by the transmitting unit, and the receiving unit may power the transmitting unit.

II. Example Tool Storage Units

Figure 1A:
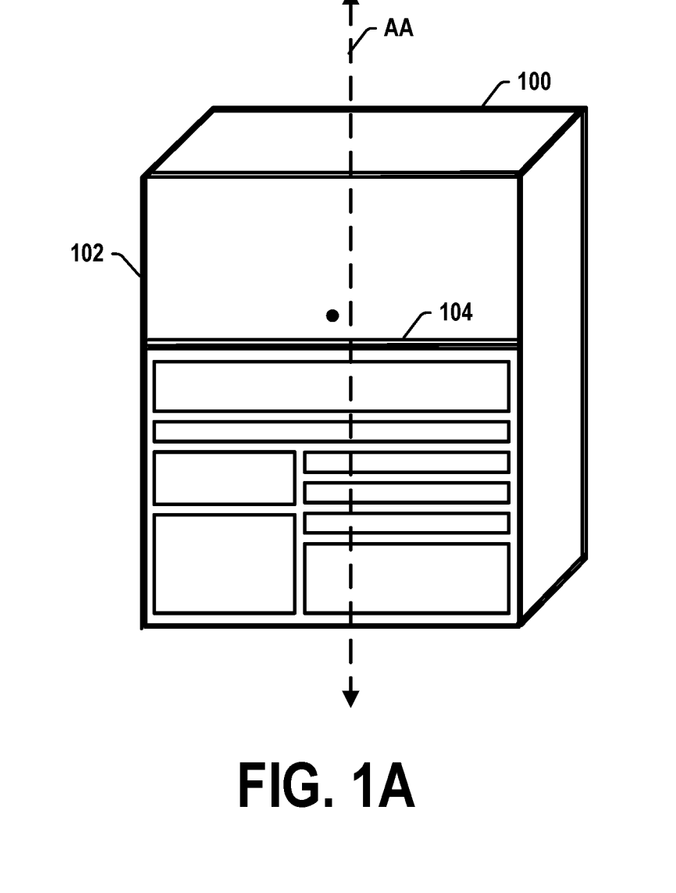
FIG. 1A is a perspective view of a tool storage unit with a closed housing in accordance with an example embodiment.

FIG. 1A depicts a tool storage unit 100 with a closed housing 102. As displayed in FIG. 1A, the tool storage unit 100 may take the form of a hutch. Additionally or alternatively, the housing 102 may one or more parts of the tool storage unit 100 (e.g., drawers, cabinets), various enclosures, among other examples. The tool storage unit 100 may be part of a larger storage device or be a standalone unit. For example, the tool storage unit 100 may include the housing 102. A user may open the housing 102 using the housing door 104. The housing 102 may be used to store various tools and equipment. Such tools and equipment are separate and distinct from the electrically powered components described herein.

The tool storage unit 100 may be connected to a computing system and a main power source. Further, the tool storage unit 100 may include various components, e.g., light sources, locks, mechanical sensors, and others. Each of these components may be connected to the computing system and/or main power source.

The computing system may receive information from various components of the tool storage unit 100 and transmit instructions to various components of the tool storage unit 100. For instance, the computing system may receive a signal from a sensor of the storage device indicating that the storage unit is closed. In response, the computing system may send an instruction to a light source of the storage unit to turn on.

Figure 1B:
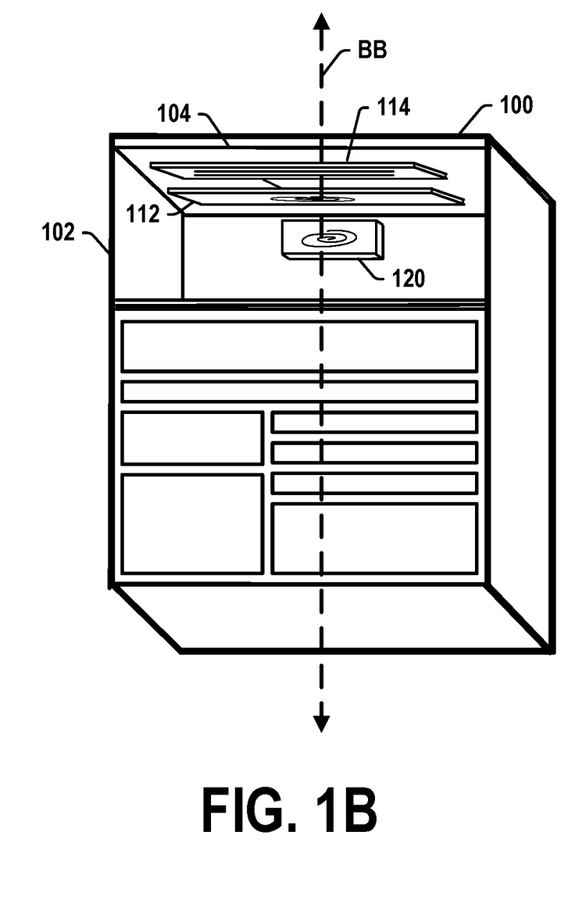
FIG. 1B is a perspective view tool storage unit with an open housing in accordance with an example embodiment.

FIG. 1B depicts the tool storage unit 100 with an opened housing 102. A user may lift the housing door 104 to be near the top of the housing 102, perhaps to access tools or equipment stored in the housing 102. A light source 114 and/or one or more other electrically powered components may be attached to the housing 102 and/or the housing door 104. The light source 114 may be connected to a receiving antenna 112. The light source 114 and the receiving antenna 112 may be part of a receiving unit. Using the receiving antenna 112, the receiving unit may receive energy transmitted by a transmitting antenna of a transmitting unit. For example, the transmitting antenna 120 may be one of multiple transmitting antennas that are able to transmit energy to a receiving antenna.

Figure 2A:
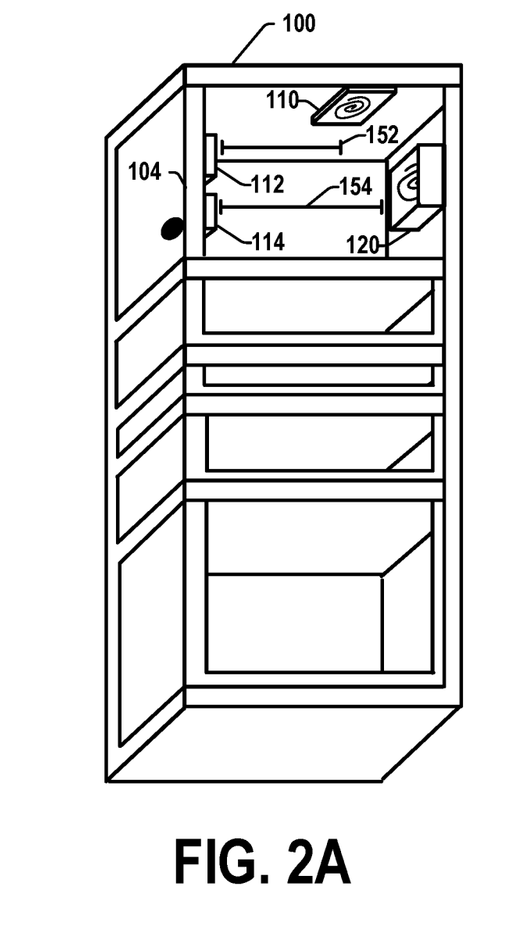
FIG. 2A depicts a cross sectional view of a tool storage unit with a closed housing in accordance with an example embodiment.

FIG. 2A depicts a cross section of the tool storage unit 100 with a closed housing. As shown in FIG. 1A, FIG. 2A depicts a cross section of the tool storage unit 100 along a line AA. Shown in FIG. 2A, tool storage unit 100 includes the receiving antenna 112 and the light source 114 as part of the receiving unit, and both the receiving antenna 112 and the light source 114 may be attached to a housing door 104 of a housing 102. Further, tool storage unit 100 may include the transmitting antenna 110 and the transmitting antenna 120 as part of one or more transmitting units.

Power transmitted by one or both of the transmitting antennas 110 and 120 may help power a light source 114. Namely, the transmitting antennas 110 and 120 may help power the receiving antenna through induction, where the current in the transmitting antennas 110 and 120 may produce a magnetic field, which may in turn cause a current to be induced in a receiving antenna, e.g., the receiving antenna 112. The receiving antenna may perhaps need to be less than a predetermined distance away and/or be at a particular angle in order to receive energy from the transmitting antenna 110 and/or the transmitting antenna 120. For example, the predetermined distance may be from contact (e.g., zero inches) to approximately 36 inches. In some examples, the predetermined distance may be 12 inches. In some examples, the predetermined distance may be between 6 inches and 18 inches. In some examples, the predetermined distance may be between 3 inches and 15 inches. In some examples, the predetermined distance may be between 9 inches and 21 inches.

Further, the receiving antenna may be parallel to the transmitting antenna (e.g., having an angle of 0 degrees). In some examples, the receiving antenna may be any angle except perpendicular (e.g., having an angle of 90 degrees) to the transmitting antenna. In some examples, the angle between the receiving antenna and transmitting antenna may be between −271 degrees and 89 degrees for the receiving antenna to receive energy from the transmitting antenna. In some examples, the angle between the receiving antenna and transmitting antenna may be between 92 degrees and 269 degrees for the receiving antenna to receive energy from the transmitting antenna. In some examples, the angle between the receiving antenna and the transmitting antenna may be between −45 degrees to 45 degrees to receive energy from the transmitting antenna. In some examples, the angle between the receiving antenna and transmitting antenna may be between 135 degrees and 225 degrees for the receiving antenna to receive energy from the transmitting antenna. In some examples, receiving antenna may be concentric with a transmitting antenna, and the receiving antenna may receive energy from the transmitting antenna.

As such, the receiving antenna 112 may not be able to receive any transmitted energy from the transmitting antennas 110 and 120 in the position shown by FIG. 2A. Rather, the transmitting antenna 110 may be at an incorrect angle (e.g., perpendicular) relative to the receiving antenna 112 and too far away from the transmitting antenna 120. Additionally, the transmitting antenna 120 may be too far away from the receiving antenna 112 for the transmitting antenna 120 to induce any current in the receiving antenna 112. Specifically, the distance from the receiving antenna 112 to the transmitting antenna 110 (e.g., a distance 152) and the distance from receiving antenna 114 to the transmitting antenna 120 (e.g., a distance 154) may both be more than a predetermined distance value, such that the transmitting antennas 110 and 120 are unable to transmit signals so far. As mentioned above, the predetermined distance value could be between zero inches (e.g., from contact) to 36 inches. The predetermined distance value may depend on signal strength from the transmitting antenna. If the signal strength of the transmitting antenna is high, the predetermined distance value may also be high. Whereas, if the signal strength of the transmitting antenna is low, the predetermined distance may also be low. When a user moves a component of the storage device (e.g., door or drawer), the receiving antenna 112 may become closer to the transmitting antenna 110 and/or transmitting antenna 120. Additionally or alternatively, the receiving antenna 112 may become in the plane (e.g., parallel) or out of the plane (e.g., perpendicular) to transmitting antenna 110 and/or transmitting antenna 120, causing the receiving antenna 112 to be able to receive energy or no longer be able to receive energy from transmitting antenna 110 and/or transmitting antenna 120.

As mentioned above, the tool storage unit 100 may also include various other components. For example, the tool storage unit 100 may include a sensor that senses whether the housing door 104 is in a closed position in order to determine whether to power the transmitting antenna 110 and/or the transmitting antenna 120. When the sensor detects that the housing door 104 is in the closed position, the computing device may determine to not power the transmitting antenna 110 and/or the transmitting antenna 120. Whereas, when the sensor detects that the housing door 104 is in the open position, the computing device may determine to power the transmitting antenna 110 and/or the transmitting antenna 120 so as to facilitate powering components (e.g., light sources) connected to the receiving units.

Figure 2B:
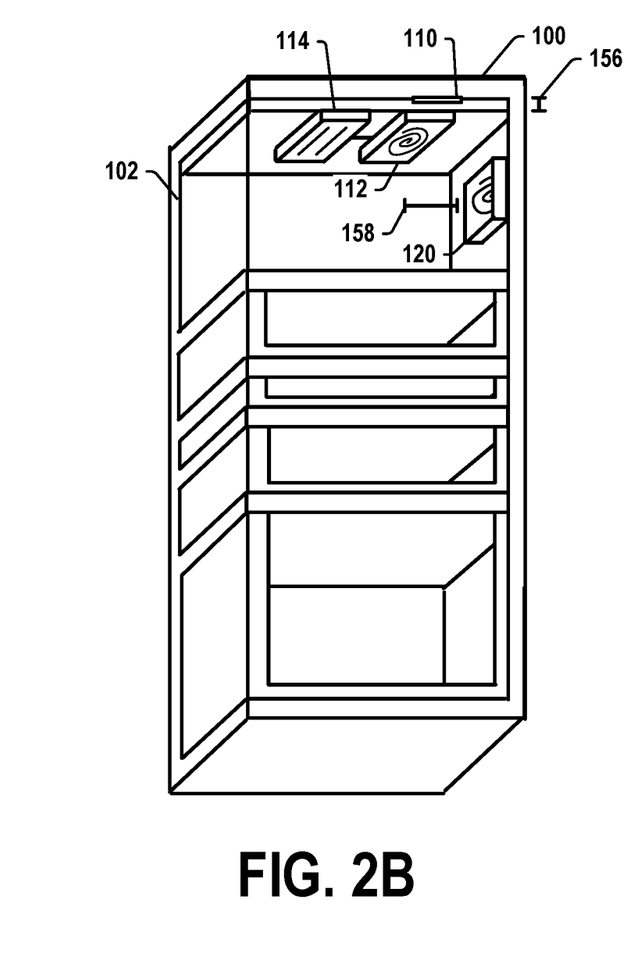
FIG. 2B depicts a cross sectional view of a tool storage unit with an open housing in accordance with an example embodiment.

FIG. 2B depicts a cross section of a storage device with an open housing. As shown in FIG. 1B, FIG. 2B depicts a cross section of the tool storage unit 100 along a line BB. As shown, the transmitting antenna 110 may be adjacent and parallel to the receiving antenna 112. When the transmitting antenna 110 is powered, the transmitting antenna may induce a current in the receiving antenna 112, which may facilitate powering the lighting source 114.

In particular, the transmitting antenna 110 may be close enough to the receiving antenna 112 that the receiving antenna 112 is able to receive energy transmitted by the transmitting antenna 110 (e.g., a distance 156 between the transmitting antenna 110 and the receiving antenna 112 may be less than a predetermined value). In contrast, a distance 158 from the transmitting antenna 120 to the receiving antenna 112 may be less or more than the predetermined threshold, but receiving antenna 112 may be unable to receive the transmitted energy as the receiving antenna 112 is not in the correct orientation relative to the transmitting antenna 120. Additionally or alternatively, the tool storage unit 100 may not include the transmitting antenna 110 (not shown in FIG. 2B). A user may move the receiving antenna 112 such that it is in the same plane as the transmitting antenna 120 to enable the receiving antenna 112 to receive energy from the transmitting antenna 120. In other words, the receiving antenna 112 may move from being out of plane of the transmitting antenna 120 to in plane with the transmitting antenna 120 and/or from being out of concentricity to being in concentricity with the transmitting antenna 120.

FIGS. 1A, 1B, 2A, and 2B are provided for illustration, and are not meant to be limiting. Various other components and variations on the positioning of the transmitting unit and receiving unit are possible.

In particular, the orientations and positions of the transmitting antennas and receiving antennas may depend on several factors, including the number of times the transmitting antenna and receiving antenna wires are wrapped, the direction that the transmitting antenna and receiving antenna wires are wrapped, the amount of current flowing through the transmitting antenna and the receiving antenna, the structure of the tool storage unit 100, among various other factors.

As another example, one or more transmitting units and one or more receiving units can be used to power components attached to drawers or other enclosures of tool storage unit 100. For example, the receiving unit could be attached to a side of the drawer and the transmitting unit could be attached to be parallel with the receiving unit when the drawer is pushed into the storage unit. Thus, when the transmitting unit and receiving unit are lined together (e.g., when the drawer is pushed into the storage unit), the receiving unit may receive energy from the transmitting unit. In some examples, the receiving unit may store the energy in an energy storage element (e.g., a battery), which may be used later. For example, the energy storage element may be connected with a light source, and when the user pulls the drawer out, a computing device of the tool storage unit 100, of the transmitting unit, and/or of receiving unit may transmit a signal to the light source to operate (e.g., turn on).

Figure 3:
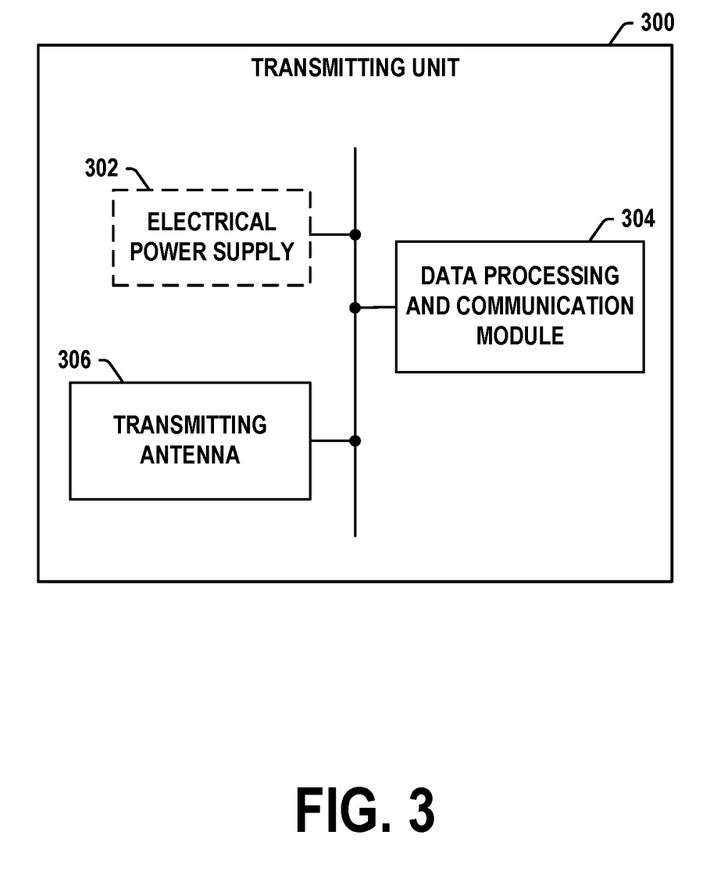
FIG. 3 is a block diagram of a transmitting unit in accordance with an example embodiment.

FIG. 3 is a block diagram of a transmitting unit 300. Transmitting unit 300 may contain various components. For example, the transmitting unit 300 may include an electrical power supply 302, a data processing and communication module 304, and a transmitting antenna 306. The transmitting unit 300 may also include various other components, including one or more transmitting antennas, sensors, and power electronics.

The electrical power supply 302 may be a device capable of supplying tool storage unit 100 with power. For example, the electrical power supply 302 may include a wired power connection to an AC power outlet, one or more batteries, one or more fuel cells, among other examples. In some examples, electrical power supply 302 may be optional or be part of the tool storage unit that is not the transmitting unit 300. In other examples, the tool storage unit might not include an electrical power supply 302 and the tool storage unit is configured to couple to an external electrical power supply.

The data processing and communication module 304 may include one or more computing systems that perform and/or are configured to perform operations. Further, the data processing and communication module 304 may include one or more wireless communication modules that facilitate communication by the transmitting unit 300 with one or more entities according to one or more protocols. For example, the data processing and communication module 304 may be or may include a wired interface, such as an Ethernet interface, a radio-frequency (RF) antenna, or a Wi-Fi antenna, which may be able to send and receive data from other antennas, e.g., Bluetooth antennas, RF antennas, and Wi-Fi antennas. The data processing and communication module 304 may include other, perhaps additional, components as well.

The transmitting unit 300 may also include the transmitting antenna 306. The transmitting antenna 306 may include one or more induction coils and/or one or more RF antennas. The induction coils may produce and/or be configured to produce one or more magnetic fields. Further, the RF antennas may transmit and/or be configured to transmit a beam or wave of radio frequency radiation. Both the induction coils and/or RF antennas may induce and/or be configured to induce an electric current in a receiving antenna of a receiving unit. In some examples, the transmitting antenna 306 may include a configuration of induction coils and/or RF antennas that are suited to transmitting energy to the receiving unit, perhaps such that the transmitting antennas are oriented such that they may project and/or cast a magnetic field and/or wave in varying planes/vectors from each other. For example, for a transmitting unit with two transmitting antennas, one antenna may be orientated orthogonal/perpendicular to the other transmitting antenna, perhaps in an implementation as illustrated in FIGS. 1A, 1B, 2A, and 2B.

The transmitting unit 300 may also include additional components, including an alternating current/direct current (AC/DC) converter, amplifiers, power electronics, directional couplers, analog-to-digital converters, capacitor networks, logic elements, and/or other components that may facilitate this process. For example, the AC/DC converter may be a separate component or part of the electrical power supply 302 that facilitates converting alternating current received from a wall power supply to direct current, which a computing system of the transmitting unit 300 and/or of the tool storage unit may then be used to power the components of the transmitting unit 300. Amplifiers may help attenuate signals from microcontrollers and/or sensors. Power electronics may include rectifiers (e.g., AC to DC converters), inverters (e.g., DC to AC converters), DC to DC converters, and AC to AC converters.

Additionally or alternatively, transmitting unit 300 may not include all of the components illustrated in FIG. 3. For example, data processing and communication may be limited to a computing system of the tool storage system, and the computing system of the tool storage system may send instructions to the components of the transmitting unit 300.

Figure 4:
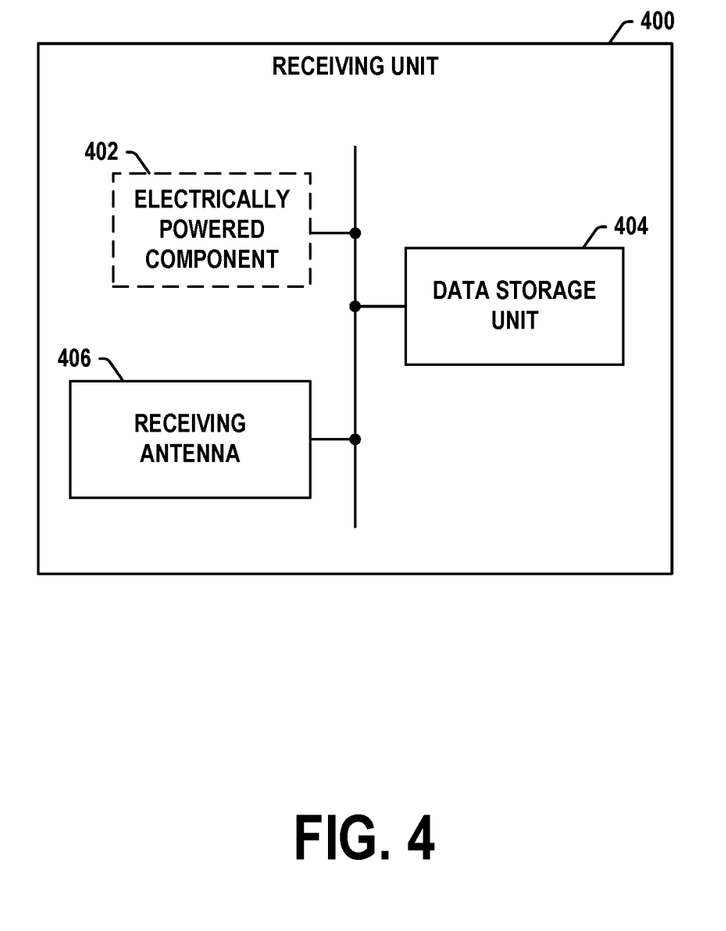
FIG. 4 is a block diagram of a receiving unit in accordance with an example embodiment.

FIG. 4 is a block diagram of a receiving unit 400. The receiving unit 400 may contain various components. For example, the receiving unit 400 may include an electrically powered component 402, a data storage unit 404, and a receiving antenna 406. The receiving unit 400 may also include various other components.

The electrically powered component 402 may include a light source (e.g., a light emitting diode (LED), fluorescent lights, etc.), an electric motor, speaker, and/or other element that may convert or facilitate converting electric power to heat, light, sound, or motion. In some examples, the electrically powered component 402 may not be part of receiving unit 400 and instead integrated into another component of the tool storage unit.

The data storage unit 404 may include one or more data storage units that perform and/or are configured to store data. In some examples, the tool storage unit may have one or more other data storage units aside from the data storage unit 404 of the receiving unit 400. Further, data storage unit 404 and/or other data storage units of receiving unit 400 may store instructions, which one or more processors may execute to perform various operations described herein. In some examples, the receiving unit 400 may not include the data storage unit 404, and the receiving unit 400 may only include the electrically powered component 402 and the receiving antenna 406.

The receiving antenna 406 may include one or more induction coils and/or one or more RF antennas. The induction coils may produce and/or be configured to produce one or more magnetic fields. Further, the RF antennas may transmit and/or be configured to transmit a beam or wave of radio frequency radiation. As mentioned, a transmitting antenna may induce a current in the receiving antenna 406 when the receiving antenna placed less than a predetermined distance away and in a particular orientation from the transmitting antenna. In some examples, the receiving antenna 406 may include a configuration of induction coils and/or RF antennas that are suited to receiving energy from the transmitting unit, perhaps such that the receiving antennas are oriented such that they may receive energy from projected and/or casted magnetic fields and/or waves in varying planes/vectors from each other. For example, for a receiving unit with two receiving antennas, one receiving antenna may be oriented parallel to the other receiving antenna, so that the receiving antennas have a higher likelihood of receiving energy transmitted by a transmitting antenna in any given direction.

Further, the receiving unit 400 may also include additional components, such as AC/DC converters, power electronics, amplifiers, directional couplers, analog-to-digital converters, capacitor networks, and/or logic elements, and/or other components that may facilitate this process. For example, the AC/DC converter may be a separate component or part of an electrical power supply that facilitates converting alternating current received from a wall power supply to direct current, which a computing system of the receiving unit 400 and/or of the tool storage unit may then be used to power the components of the receiving unit 400. Amplifiers may help attenuate signals from microcontrollers and/or sensors. Power electronics may include rectifiers (e.g., AC to DC converters), inverters (e.g., DC to AC converters), DC to DC converters, and AC to AC converters.

Additionally or alternatively, receiving unit 400 may not include all of the components illustrated in FIG. 4. For example, data processing and communication may be limited to a computing system of the tool storage system, and the computing system of the tool storage system may send instructions to the components of receiving unit 400.

In particular, the electrically powered component 402 of the receiving unit 400 may be an LED light and the receiver antenna 406 may be an induction coil.

Further, the electrically powered component 402 of the receiving unit 400 could be an electric motor and the receiving antenna 406 could be an induction coil.

In addition, the receiving unit 400 may include a supplemental energy storage element, which may be charged initially. Thus, the electrically powered component 402 may be operated initially, even if the receiving antenna 406 of receiving unit 400 is not able to capture and/or receive energy from the transmitting unit 300.

Additionally or alternatively, the tool storage unit could include one or more transmitting units, e.g., the transmitting unit 300, and one or more receiving units, e.g., the receiving unit 400.

In some examples, one or more transmitting units, one or more receiving units, certain components of the one or more transmitting units, and/or certain components of the one or more receiving units could be fixably mounted to the tool storage unit (e.g., the housing). For example, a receiving unit could include a light, which could be fixed onto the tool storage unit, perhaps in a configuration shown in FIGS. 1A, 1B, 2A, and/or 2B.

Additionally or alternatively, one or more receiving units, certain components of the one or more transmitting units, and/or certain components of the one or more receiving units could be modular and/or detachably mounted to the tool storage unit (e.g., the housing) through fasteners. For example, the receiving unit or electrically powered component could be detachably mounted to the tool storage using VELCRO®, mating magnets connectors, adhesive, etc.

Further, the transmitting antenna 306 and/or the receiving antenna 406 may be a coil of wire or other conductive material which, when placed in a magnetic field where the magnetic field lines pass through the plane or planes formed by the coil, induce an electric current in the coil.

In some examples, the transmitting unit 300 may only include one or more transmitting antennas, e.g., the transmitting antenna 306, and/or the receiving unit 400 may only include one or more receiving antennas, e.g., the receiving antenna 406. For example, the receiving unit 400 may only include one or more receiving antennas, e.g., the receiving antenna 406, to receive energy transmitted by the transmitting antenna 306, and the receiving unit 400 may not include the electrically powered component 402 or the data storage unit 404.

In addition, one or more transmitting antennas and/or one or more receiving antennas, e.g., the transmitting antenna 306 and/or the receiving antenna 406, may both be coil shaped. The size of each transmitting antenna may depend on the specifications of each receiving antenna (e.g., size, distance apart, etc.), and each receiving antenna may be sized to interact with a magnetic field and/or a transmitting antenna outputting an electromagnetic signal.

Energy captured by the one or more receiving antennas may, in addition to powering the electronics in the light so the light operates, charge an energy storage element that may be attached to the electrically powered component of the receiving unit. For example, the receiving unit may have an additional component that may be capable of storing energy (e.g., one or more batteries and/or capacitors), and this additional component may be connected to the electrically powered component. The additional component capable of storing energy may power the electrically powered component of the receiving unit even when the receiving antenna is not receiving and/or capturing energy from the transmitting unit.

Further, one or more receiving antennas and/or one or more transmitting antennas may be connected to an AC/DC converter which may be connected to a charging circuit and a communication unit. In some examples, one or more receiving antennas may be embedded within the electrically powered component, enclosed within the housing of the tool storage unit, and/or affixed to the outer surface of the tool storage unit.

Figure 5:
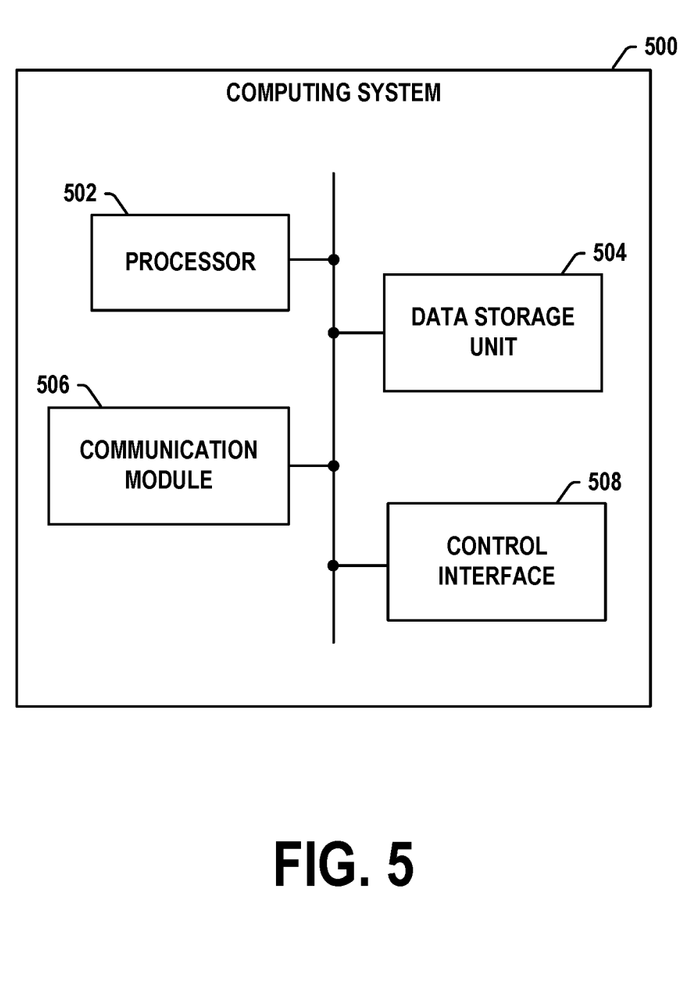
FIG. 5 is a block diagram of a computing system in accordance with an example embodiment.

FIG. 5 is a simplified block diagram of an example computing system 500. The computing system 500 may perform and/or be configured to perform one or more operations. These operations could include those disclosed in this disclosure. The computing system 500 may also include various components. The computing system 500 may include a processor 502, a data storage unit 504, a communication module 506, and a control interface 508. The processor 502 may include one or more general-purpose processors (e.g., microprocessors). Further, the processor 502 may execute program instructions included in the data storage unit 504.

The data storage unit 504 may be or may include one or more volatile, non-volatile, removable, and/or non-removable storage components, which may be integrated in whole or in part with the processor 502. For example, the data storage unit 504 may include magnetic, optical, and/or flash storage. Further, the data storage unit 504 may be or may include a non-transitory computer-readable storage medium, having stored thereon program instructions (e.g., compiled or non-compiled program logic and/or machine code) that, upon execution by the processor 502, cause the computing system 500 and/or another computing system to perform one or more operations, including, for example, the operations described in this disclosure. These program instructions may define and/or be part of a software application. The data storage unit 504 may also store any data as described in this disclosure, among other data.

In some instances, the processor 502 may execute program instructions in response to receiving an input, such as input received via the communication module 506 and/or the control interface 508.

The communication module 506 may allow the computing system 500 to connect with and/or communicate with another entity according to one or more protocols. The computing system 500 may thus send data to and/or receive data from one or more other entities in line with one or more protocols. For example, the communication module 506 may be or may include a wired interface, such as an Ethernet interface. Further, the communication module 506 may include at least one of a Bluetooth antenna, an RF antenna, or a Wi-Fi antenna, which may be able to send and receive data from other antennas, e.g., Bluetooth antennas, RF antennas, and Wi-Fi antennas.

The control interface 508 could allow for user input, including manual overrides. As discussed above, a storage unit could include a lock. Through the control interface 508, a user may manually disable the lock actuator and/or disable the computing system 500.

The computing system 500 may include one or more of the above-described components and may be configured or arranged in various ways. In some examples, the computing system 500 may be configured to operate in line with various other computing systems, e.g., perhaps computing systems of the transmitting unit 300 and/or the receiving unit 400 if the transmitting unit 300 and/or the receiving unit 400 include computing systems.

In line with the discussion above, a system for providing electrical power to an element coupled to a tool storage unit is disclosed. The system may include a transmitting unit coupled to the tool storage unit. The transmitting unit may include a data processing and communication module. Additionally, the transmitting unit may include a transmitting antenna configured to be coupled to an electrical power supply and transmit energy. Further, the system may include a receiving unit coupled to the tool storage unit. The receiving unit may include a receiving antenna. Also, the receiving unit may include the element.

Also, the element could be a light emitting diode (LED) light, an electric motor, or an actuator.

Additionally, the transmitting unit could be in the tool storage unit, and the receiving unit could be in in the tool storage unit.

Further, the transmitting antenna could include an induction coil or a radio frequency (RF) emitting antenna.

Also, the receiving antenna could include an induction coil or a RF emitting antenna.

The transmitting unit could comprise at least one of an electrical power supply or first power electronics, and the receiving unit could further comprise second power electronics.

In line with the discussion above, the tool storage unit is provided. The tool storage unit includes a housing configured to store a tool, a transmitting unit mounted to the housing, a receiving unit mounted to the housing, and an electrically powered component mounted to the housing. The transmitting unit is configured to be electrically coupled to an electrical power supply and to transmit energy. The receiving unit includes a receiving antenna. The electrically powered component is electrically coupled to the receiving antenna. The transmitting antenna and the receiving antenna are positioned within a predetermined distance on the housing. The receiving antenna is configured to receive the energy transmitted by the transmitting antenna and to use the received energy to power the electrically powered component.

In addition, the electrically powered component may be a LED light, an electric motor, an actuator, or a speaker.

Further, the transmitting antenna could include an induction coil or a RF emitting antenna.

Also, the receiving antenna could include an induction coil or a RF emitting antenna.

Additionally, the housing could include a first portion and a second portion. The transmitting unit could be mounted on the first portion. The receiving unit could be mounted on the second portion. The second portion could be configured to move with respect to the first portion such that the transmitting antenna and the receiving antenna are positioned within the predetermined distance.

Further, the electrically powered component could be fixedly mounted to the housing.

Also, the electrically powered component could be detachably mounted to the housing.

Additionally, the receiving antenna could be configured to receive energy transmitted by the transmitting antenna at least when the receiving antenna is parallel to the transmitting antenna.

In addition, the receiving unit could include a plurality of receiving antennas. Each receiving antenna of the plurality of receiving antennas could be configured to receive energy from a common transmitting antenna.

Further, the receiving unit could further include an electric motor, and wherein the receiving antenna is an induction coil.

Also, the transmitting unit could be configured to induce a current in the receiving unit.

In addition, the receiving antenna could be configured to receive energy in a radio frequency spectrum or a microwave frequency spectrum.

Additionally, the receiving unit could further comprise an energy storage element. The receiving unit could be configured to charge the energy storage element and the electrically powered component.

In line with the discussion above, a method for providing electrical power to an electrically powered component coupled to a tool storage unit is provided. The tool storage unit includes a housing configured to store a tool, a transmitting unit mounted to the housing, the transmitting unit electrically coupled to an electrical power supply, and a receiving unit mounted to the housing, where the electrically powered component is mounted to the housing and is electrically coupled to the receiving antenna. The method includes positioning a transmitting antenna of the transmitting unit within a predetermined distance of a receiving antenna of the receiving unit. The method includes receiving, via the electrical power supply, electrical power at the transmitting antenna. The method includes transmitting energy, via the transmitting antenna, to the receiving antenna. And the method includes powering the electrically powered component using energy received by the receiving antenna.

In some embodiments, all or substantially all of the received energy is used to power to the electrically powered component. In some embodiments, powering the electrically powered component using energy received by the receiving antenna comprises operating the electrically powered component using energy received by the receiving antenna. In some examples, all or substantially all of the received energy is used to operate the electrically powered component.

Further, in some embodiments, only a portion of the received energy is used to power the electrically powered component. In some such embodiments, the method further includes charging an energy storage element using another portion of the received energy. Additionally or alternatively, in some embodiments, the method further includes charging the electrically powered component using another portion of the received energy.

Further, in line with the discussion above, a non-transitory computer-readable medium having stored thereon program instructions that upon execution of a processor, cause performance of operations, is provided. The operations include powering a transmitting antenna of a transmitting unit, wherein powering the transmitting antenna causes a receiving unit of a tool storage unit to receive energy. The tool storage unit includes a housing configured to store a tool, a transmitting unit mounted to the housing, a receiving unit mounted to the housing, and an electrically powered component mounted to the housing. The transmitting unit includes a transmitting antenna configured to be electrically coupled to an electrical power supply and to transmit energy. The receiving unit includes a receiving antenna. The electrically powered component is coupled to the receiving antenna. The transmitting antenna and the receiving antenna are positioned within a predetermined distance on the housing. The receiving antenna is configured to receive the energy transmitted by the transmitting antenna and to use the received energy to power the electrically powered component.

III. Conclusion

It should be understood that the arrangements described herein and/or shown in the drawings are for purposes of example only and are not intended to be limiting. As such, those skilled in the art will appreciate that other arrangements and elements (e.g., machines, interfaces, functions, orders, and/or groupings of functions) can be used instead, and some elements can be omitted altogether.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing embodiments only, and is not intended to be limiting.

In this description, the articles "a," "an," and "the" are used to introduce elements and/or functions of the example embodiments. The intent of using those articles is that there is one or more of the introduced elements and/or functions.

In this description, the intent of using the term "and/or" within a list of at least two elements or functions and the intent of using the terms "at least one of," "at least one of the following," "one or more of," "one or more from among," and "one or more of the following" immediately preceding a list of at least two components or functions is to cover each embodiment including a listed component or function independently and each embodiment including a combination of the listed components or functions. For example, an embodiment described as including A, B, and/or C, or at least one of A, B, and C, or at least one of: A, B, and C, or at least one of A, B, or C, or at least one of: A, B, or C, or one or more of A, B, and C, or one or more of: A, B, and C, or one or more of A, B, or C, or one or more of: A, B, or C is intended to cover each of the following possible embodiments: (i) an embodiment including A, but not B and not C, (ii) an embodiment including B, but not A and not C, (iii) an embodiment including C, but not A and not B, (iv) an embodiment including A and B, but not C, (v) an embodiment including A and C, but not B, (v) an embodiment including B and C, but not A, and/or (vi) an embodiment including A, B, and C. For the embodiments including component or function A, the embodiments can include one A or multiple A. For the embodiments including component or function B, the embodiments can include one B or multiple B. For the embodiments including component or function C, the embodiments can include one C or multiple C. In accordance with the aforementioned example and at least some of the example embodiments, "A" can represent a component, "B" can represent a system, and "C" can represent a system.

The use of ordinal numbers such as "first," "second," "third" and so on is to distinguish respective elements rather than to denote an order of those elements unless the context of using those terms explicitly indicates otherwise. Further, the description of a "first" element, such as a first plate, does not necessitate the presence of a second or any other element, such as a second plate.

What is claimed is:

1. A tool storage unit comprising:
   a housing configured to store a tool;
   a transmitting unit, mounted within the housing, comprising:
     a transmitting antenna electrically coupled to an electrical power supply and configured to transmit energy, and
     a data processing and communication module coupled to the transmitting antenna;
   a receiving unit, mounted to the housing, comprising:
     a receiving antenna within the housing; and
     an electrically powered component, electrically coupled to the receiving antenna, with the transmitting antenna and the receiving antenna positioned in a non-parallel orientation and within a predetermined distance of each other, the receiving antenna configured to receive energy transmitted by the transmitting antenna and power the electrically powered component; and
   wherein the data processing and communication module comprises a computing system configured to facilitate communication of data between the transmitting unit and the receiving unit according to a communication protocol.

2. The tool storage unit of claim 1, wherein the electrically powered component is at least one of the group consisting of an electric motor, an actuator, and a speaker.

3. The tool storage unit of claim 1, wherein the transmitting antenna is at least one of the group consisting of an induction coil and a RF emitting antenna.

4. The tool storage unit of claim 1, wherein the receiving antenna is at least one of the group consisting of an induction coil and an RF antenna.

5. The tool storage unit of claim 1, wherein the housing comprises a first portion and a second portion, wherein the transmitting unit is mounted within the first portion, wherein the receiving unit is mounted within the second portion, and wherein the second portion is configured to move with respect to the first portion such that the transmitting antenna and the receiving antenna are positioned within the predetermined distance whereby the receiving antenna is enabled to receive power from the transmitting antenna.

6. The tool storage unit of claim 1, wherein the electrically powered component is fixedly mounted to the housing.

7. The tool storage unit of claim 1, wherein the electrically powered component is detachably mounted to the housing.

8. The tool storage unit of claim 1, wherein the receiving unit comprises a plurality of receiving antennas, and wherein each receiving antenna of the plurality of receiving antennas are configured to receive energy from a common transmitting antenna.

9. The tool storage unit of claim 1, wherein the receiving unit further comprises an electric motor, and wherein the receiving antenna is an induction coil.

10. The tool storage unit of claim 1, wherein the transmitting unit is configured to induce a current in the receiving unit.

11. The tool storage unit of claim 1, wherein the receiving antenna is configured to receive energy in a radio frequency spectrum or a microwave frequency spectrum.

12. The tool storage unit of claim 1, wherein the receiving unit further comprises an energy storage element, and wherein the receiving unit is configured to use received energy to charge the energy storage element.

13. The tool storage unit of claim 1, wherein the data processing and communication module comprises a wired interface, and wherein the wired interface comprises an Ethernet interface.

14. The tool storage unit of claim 1, wherein the data processing and communication module comprises a radio-frequency antenna.

15. The tool storage unit of claim 1, wherein the data processing and communication module comprises a Wi-Fi antenna.

16. The tool storage unit of claim 13, wherein the data processing and communication module comprises a Bluetooth antenna.

17. The tool storage unit of claim 1, wherein the communication protocol is Ethernet.

18. The tool storage unit of claim 1, wherein the communication protocol is Wi-Fi.

19. A method for providing electrical power to an electrically powered component coupled to a tool storage unit, wherein the tool storage unit comprises a housing configured to store a tool, a transmitting unit mounted within the housing, comprising a transmitting antenna and a data processing and communication module coupled to the transmitting unit, the data processing and communication module comprising a computing system configured to facilitate communications between the transmitting unit and a receiving unit according to a communication protocol, wherein the receiving unit is mounted to the housing, wherein the receiving unit comprises a receiving antenna within the housing, wherein the electrically powered component is electrically coupled to the receiving antenna, wherein the data processing and communication module comprises a computing system configured to facilitate communication of data between the transmitting unit and the receiving unit, and wherein the method comprises:

positioning the transmitting antenna within a determined distance of the receiving antenna and in a non-parallel orientation;

receiving, via an electrical power supply, electrical power at the transmitting antenna;

transmitting, via the transmitting antenna, both electrical power and data to the receiving antenna; and powering the electrically powered component using the electrical power received by the receiving antenna.

20. A tool storage unit comprising:

a housing configured to store a tool;

a transmitting unit, mounted within the housing, comprising a transmitting antenna electrically coupled to an electrical power supply and configured to transmit energy;

a receiving unit, mounted to a door of the housing, wherein the door is configured to be moved such that the receiving unit and transmitting unit are positioned in a non-parallel orientation, comprising:

a receiving antenna; and an electrically powered component, mounted to the door and electrically coupled to the receiving antenna, with the transmitting antenna and the receiving antenna positioned in the non-parallel orientation and within a predetermined distance of each other, the receiving antenna configured to receive energy transmitted by the transmitting antenna and power the electrically powered component, wherein the electrically powered component is at least one of the group consisting of an electric motor and a speaker.

* * * * *